July 7, 1942.  F. W. SCHREMP  2,288,846
COMBINED TYPEWRITER AND COMPUTING MACHINE
Filed May 6, 1938  7 Sheets-Sheet 3

INVENTOR
F.W. SCHREMP
BY *W. A. Sparks*
ATTORNEY

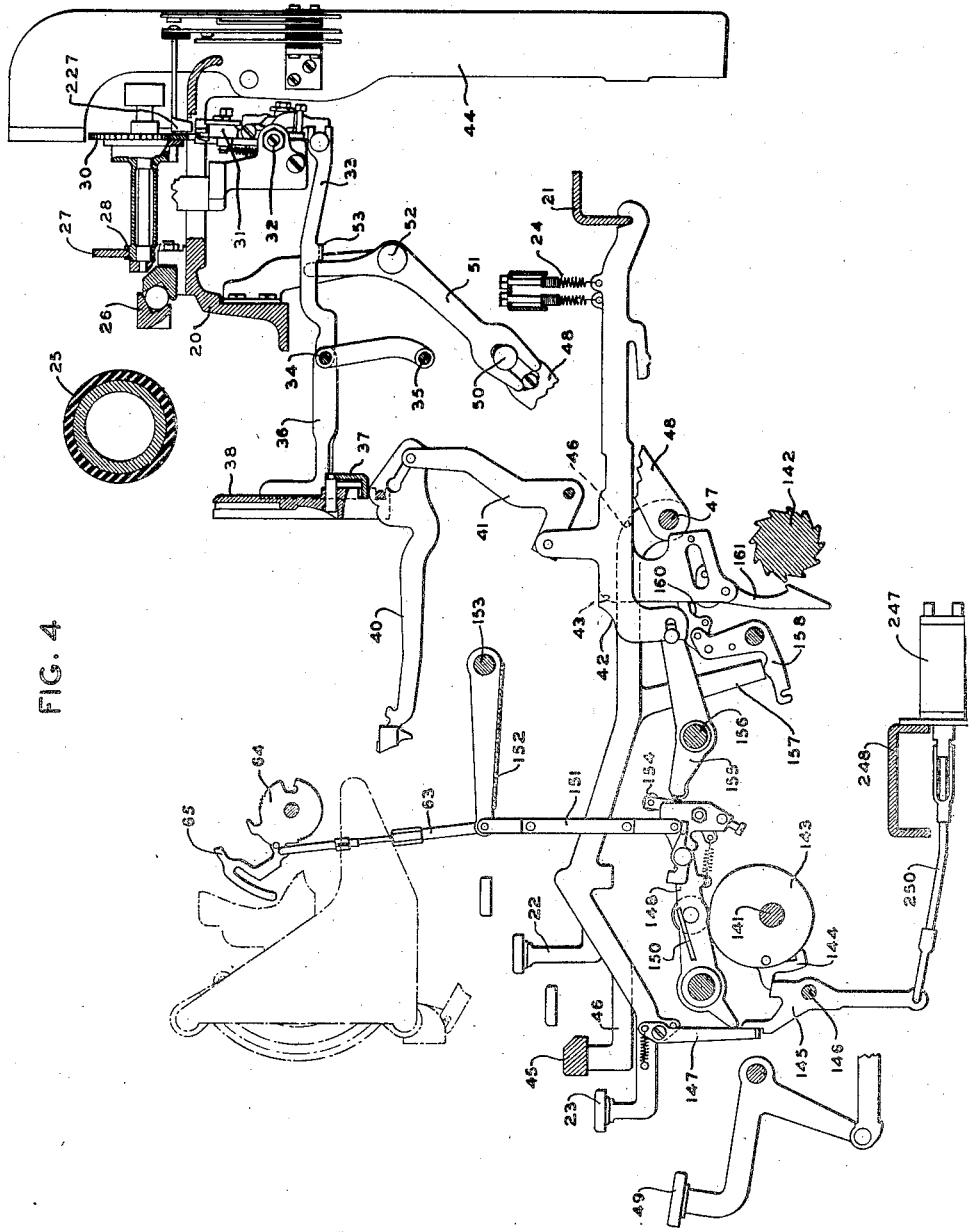

July 7, 1942. F. W. SCHREMP 2,288,846
COMBINED TYPEWRITER AND COMPUTING MACHINE
Filed May 6, 1938 7 Sheets-Sheet 5
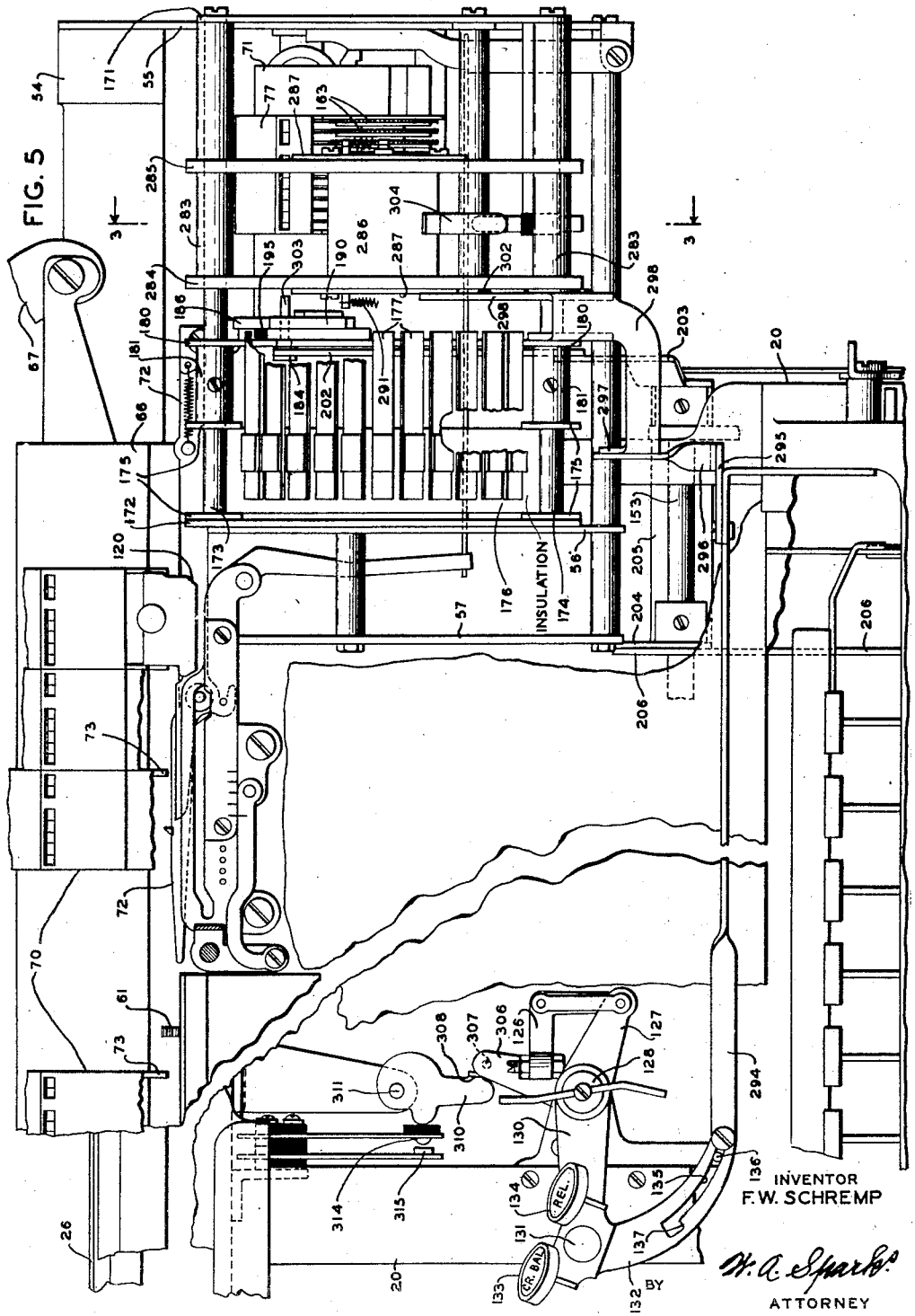
INVENTOR
F. W. SCHREMP
BY W. A. Sparks
ATTORNEY

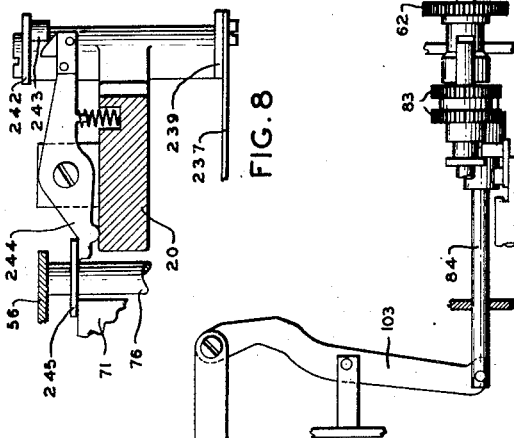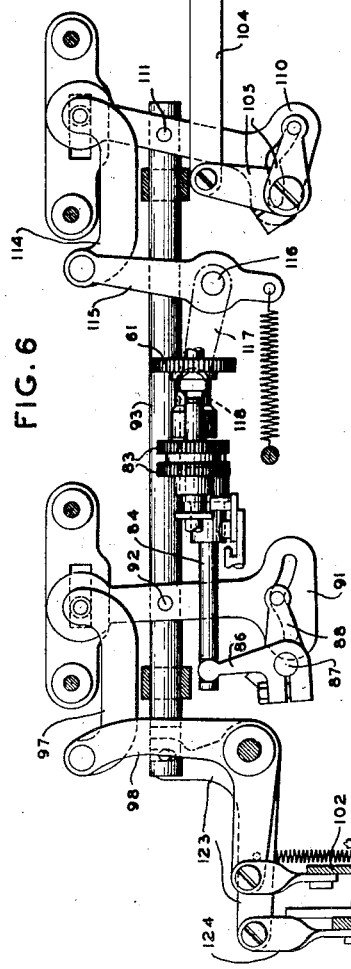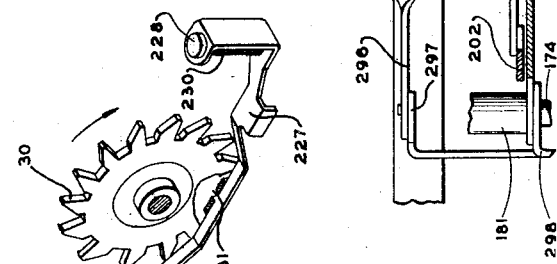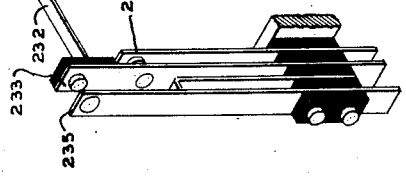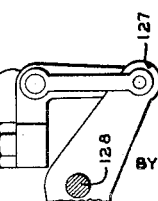

July 7, 1942.  F. W. SCHREMP  2,288,846
COMBINED TYPEWRITER AND COMPUTING MACHINE
Filed May 6, 1938  7 Sheets-Sheet 7

INVENTOR
F. W. SCHREMP
BY  *F. A. Sparks*
ATTORNEY

Patented July 7, 1942

2,288,846

UNITED STATES PATENT OFFICE 2,288,846

COMBINED TYPEWRITER AND COMPUTING MACHINE

Frederick W. Schremp, Elmira, N. Y., assignor to Remington Rand Inc., Buffalo, N. Y., a corporation of Delaware Application May 6, 1938, Serial No. 206,351

18 Claims. (Cl. 235—59)

This invention relates to combined typewriter and computing machines, and more particularly to automatic total printing mechanism for such machines.

Generally stated, it is the object of the invention to provide improved means for automatically recording numbers indicated on a totalizer or similar device.

An immediate and particular object is to provide improved means for enabling a combined typewriting and computing machine of known sort automatically to print the totals by the use of the ordinary typewriter types. From one point of view the invention may be regarded as an improvement on that described in the Patent No. 2,172,749, issued September 12, 1939, to George C. Going. The present applicant, however, is not the inventor of anything disclosed in the said Going patent.

One object of the present invention is to provide improved means for sensing the total registered on a totalizer. This means includes improved mechanism for closing electric circuits selectively according to the digits indicated.

Another object is to provide improved electrical means for translating a negative total into its true amount. A totalizer is employed which does not contain fugitive one mechanism, the electric circuits being so devised as to translate the true complement of the negative total into the true negative amount.

Other objects of the invention will be apparent from the following description.

To the above and other ends the invention consists in certain features of construction and combinations and arrangements of devices and of electric circuits, all of which will be set forth herein and particularly pointed out in the claims.

The invention is shown applied to a typewriter as the recording means, the types being selected one at a time by electromagnets. Said magnets could, however, be as readily employed to control other recording means, such, for example, as a punch for statistical cards or tapes. In the drawings the invention is shown applied to a Remington electrified bookkeeping machine. In said drawings:

Fig. 4 is a general schematic view in front to rear section of some of the mechanism of the machine with an outline of the sensing mechanism of the present invention in dot-dash lines;

Fig. 5 is a partial and fragmentary front view of the machine;

Fig. 6 is a view in front elevation and in section illustrating the change gear mechanism of the Remington machine;

Fig. 7 is an isometric detail of a certain circuit closing device;

Fig. 8 is a detail plan view partly in section on the line 8—8 of Fig. 1;

Fig. 9 is a fragmentary plan view with parts in section about on the line 9—9 of Fig. 1;

Figure 1:
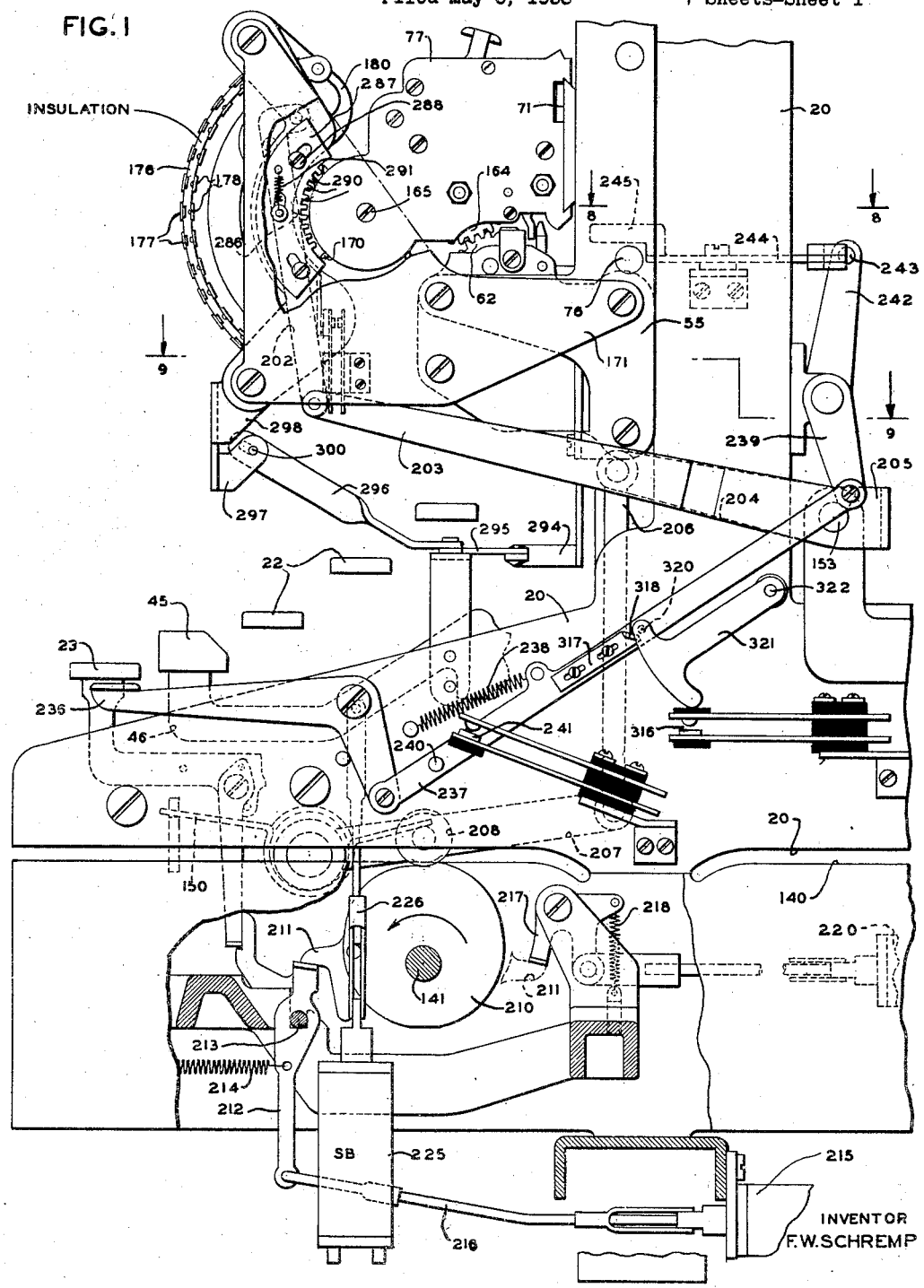
Fig. 1 is a right-hand side elevation partly in section and partly broken away of some of the forward portion of a Remington machine embodying the invention.

The Remington bookkeeping machine is well known, having been in extensive use for many years, its mechanism being shown in a line of patents which may be said to begin with the patent to Wahl 1,270,471, dated June 25, 1918. Only so much of said machine as is necessary to the understanding of the present invention is, therefore, shown in the drawings.

The Remington typewriter, which is a part of the said machine, comprises a main frame 20 of which a side plate and a front post are shown in Fig. 1, and the top plate is indicated in section in Fig. 4. The machine includes an angle bar 21, which serves as a pivot to a number of levers including alphabet key levers 22 and numeral key levers 23; and certain other levers which will be mentioned persently, all of said levers being influenced by restoring springs 24. The platen 25 is mounted in a carriage 26, the front bar of which appears in Fig. 5, and the rear bar in Fig. 4. This carriage has a feed rack 27 engaging a pinion 28 connected with an escapement wheel 30, which is controlled by feed dogs mounted on a dog rocker 31 pivoted at 32, and operated by a link 33 which at its forward end is pivoted at 34 to an arm on a rock shaft 35, which shaft has on its ends two upright arms to which are pivoted the extensions 36 of a universal bar 37 mounted in an arc-shaped groove in a type bar segment 38 in which are pivoted the usual type bars 40. Said type bars are operated by bell-cranks 41, which, in turn, are operated by levers 42 and 43 pivoted on the bar 21 and interspersed among the key levers before mentioned. The dog rocker 31 may also be operated by a space bar 45, whose bail arms 46 are fast on a rock shaft 47 having an arm 48 articulated at 50 with a lever 51 pivoted at 52 and engaging behind an ear 53 on the link 33.

The carriage 26 is drawn toward the left by the usual spring. This motion may be controlled on occasion by a tabulator mechanism, a portion of which is shown in Fig. 4 at 44. This mechanism acts when operated by depression of a tabulator key 49 to lift the rack 27 out of the pinion 28 and to interpose a stop in the path of column stops carried by the carriage.

Figure 3:
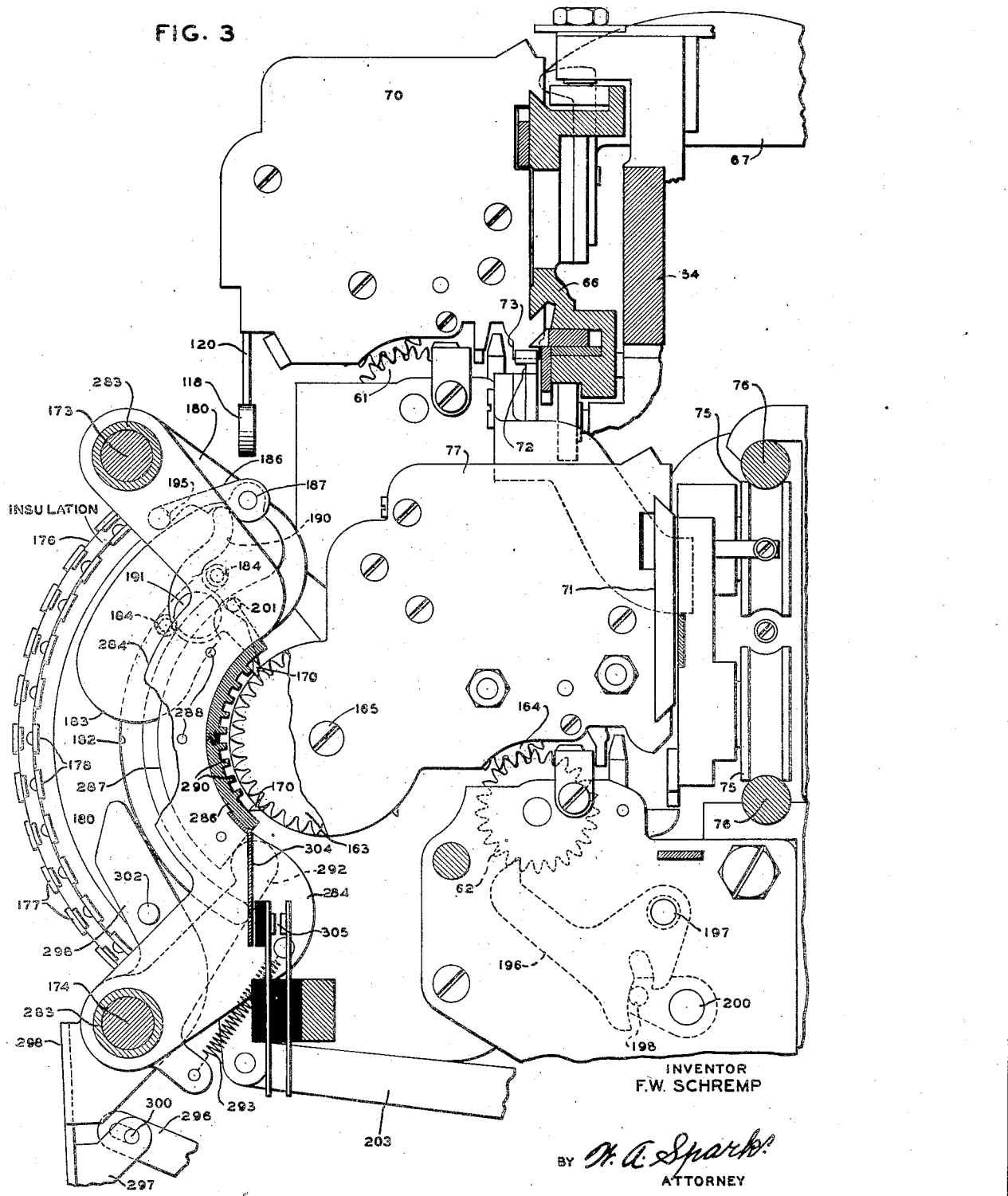
Fig. 3 is an enlarged right-hand side elevation of a portion of the machine, parts being in section on the line 3—3 of Fig. 5.

The computing mechanism comprises an actuator mounted on the front of the typewriter frame, and certain step-by-step movable totalizers. The principal frame member of the actuator consists of a casting 54, portions of which are seen in Figs. 3 and 5, and which is secured to the top plate of the typewriter.

Said frame also includes a number of plates standing in vertical front-to-rear planes, of which the end plate 55 and two of the other plates 56 and 57 are shown in Fig. 5, these plates being secured in one way or another to the casting 54. The mechanism of the actuator has for its principal function to rotate the vertical master wheel 61 (Figs. 3, 5, and 6) and a cross master wheel 62, the mechanism being operated by digit links 63 (Fig. 4) connected to so-called fan pieces 64, which, in turn, operate goose-neck cams 65, which latter actuate and determine the differential rotation of the master wheels. The mechanism includes a main truck or carriage 66 (Figs. 3 and 5) which is connected to arms 67 projecting forward from the typewriter carriage. On this truck 66 any desired number of vertical totalizers 70 are set in whatever positions are required by the work in hand.

The computing mechanism also includes a cross truck 71 connected by a pick-up beam 72 to be picked up by certain ears 73 one on each of the vertical totalizers, said pick-up beam being depressed at the end of each computing column, whereupon the cross truck jumps back to its normal right-hand position, drawn by a spring. This truck has grooved rollers 75 running on tracks 76 and it carries a cross totalizer 77. This cross totalizer has been modified for purposes of the present invention, as will be described.

The mechanism for rotating the master wheels 61 and 62 comprises the familiar change-gear mechanism of the Remington machine, as shown in Fig. 6. A gear sector operated by the goose-neck cams 65 (Fig. 4) is adapted to drive a pinion 83 splined on the master wheel shaft, either directly in addition, or indirectly in subtraction, through a meshing pinion hidden in Fig. 6, and loose for rotation on a slidable shaft 84. Said shaft 84 for the vertical master wheel is controlled through arm 86, rock shaft 87, and pin-carrying arm 88 by the usual floating cam lever 91 which can be shifted to the subtract position about its pivot 92 by link 97 pivoted to a bell-crank 98 actuated by the state-controlling hand-lever 102. The shaft 84 for the cross master wheel 62 is slid by lever 103, link 104, and bell-crank 105 from the floating cam lever 110, which can be rocked about its pivot 111 through link 114, lever 115, rock-shaft 116, arm 117, and follower 118 by means of subtract cams 120 (Figs. 3 and 5) carried by the vertical totalizers or dummies 70. These cams are adjusted to any one of their three positions to cause in the cross totalizer addition, disconnect, or subtraction of numbers written in the respective columns in the familiar way.

Both master wheels can be reversed, whatever their previous setting, by shifting the rod 93 carrying the pivots 92 and 111 of the floating levers 91 and 110. This rod is shifted by a bell-crank 123 connected by link 124 with the so-called correction hand-lever 125 of the machine. This hand-lever can also be operated through a vertical link 126 connected thereto by pin and slot connection, said link at its lower end being pivoted to an arm 127 (Fig. 5) fast on a shaft 128 and having another arm 130 to which at 131 is pivoted a three-armed lever 132 carrying a credit balance key 133 and release key 134. The third arm of this lever has a concentric slot 135 embracing a fixed pin 136 and having a locking shoulder 137, whereby when the parts are rocked by the credit balance key 133, they will be locked in reversing position, until released by tapping the release key 134. In the Remington machine the shaft 128 controls the bi-color ribbon mechanism to cause credit balances to be printed in red. As the above mechanism has been long in use in the Remington machine, and is described in Patent 1,270,541 and other patents, it need not be more fully described herein.

The credit balance key 133 is used for writing negative totals. For the writing of positive totals the cam 120 in the credit balance column sets the cross master wheel for subtraction. This credit balance key causes the true negative total to be added instead of subtracted in the cross totalizer, and causes it to be subtracted instead of added in the corresponding vertical totalizer.

The Remington electrified bookkeeping machine, as manufactured, includes a power unit (Figs. 1 and 4), one form of which is described in the patent to Hart No. 2,063,737, and various additions to and improvements on which are described in other patents. The typewriting machine frame is mounted on the main rectangular frame 140 of the power unit. Said unit has an electric motor which, by belts and gearing, constantly rotates a forward cam shaft 141 and a snatch roll 142 counter-clockwise (Fig. 4). Loose on shaft 141 are numeral cams 143, one for each numeral key 23 and each connectable to the shaft by a one-revolution clutch of which the releasable dog 144 is shown in Fig. 4, said dog normally held released by a detent 145 pivoted at 146 and tripped by a link 147 on the co-ordinated numeral key lever. The cam shown in Fig. 1 is another cam which will be described hereinafter. The cam 143 is so shaped that in the first part of its rotation it allows a follower lever 148 to be rocked clockwise by a strong spring 150, and then raises it to normal position. Said lever is connected by a link 151 with a lever 152 loose on a shaft 153 and an arm of which lever is connected to the link 63 which operates the computing mechanism. On the up-stroke of the lever 148, a pawl 154 thereon engages under a lever 155 journalled on a cross rod 156 and rocks said lever clockwise. At its rear end the lever 155 is articulated with one of the levers 42 which, through bell-crank 41, actuates the appropriate numeral type bar 40.

In order to actuate the type bars other than those for numerals, each key lever 22 has a depending finger 157 which, when the key is depressed, rocks counter-clockwise a bell-crank 158 carrying a pawl 160 which when operated rocks an actuating pawl 161 into engagement with the snatch roll 142. Said pawl 161 is pivoted to one of the levers 43 which, through a bell-crank 41 actuates the appropriate alphabetic type bar 40.

The machine contains tabulator keys 49 which control power mechanism not here shown, for actuating the carriage stops and associated devices.

The mechanism thus far described is of the well known Remington construction, but, as far as the present invention is concerned, may be of other suitable construction.

For the purposes of the present invention, the cross-totalizer 77 has been modified so as to include a series of gears 163 (Fig. 2), one meshing with each of the familiar "carrying gears" 164 of the Remington totalizer, said gears 163 preferably having forty teeth. They are rotatably mounted on a cross shaft 165 secured in forward and downward extensions of the cheek plates of the totalizer. Each gear 163 is a part of an assembly including a spacing disc and a disc 166, the three pieces secured together by rivets 167. The disc 166 has four equally spaced teeth or fingers 170 projecting beyond the periphery of the gear 163. The Going Patent No. 2,172,749, discloses assemblies similar to those just described but the gears have thirty teeth.

Figure 2:
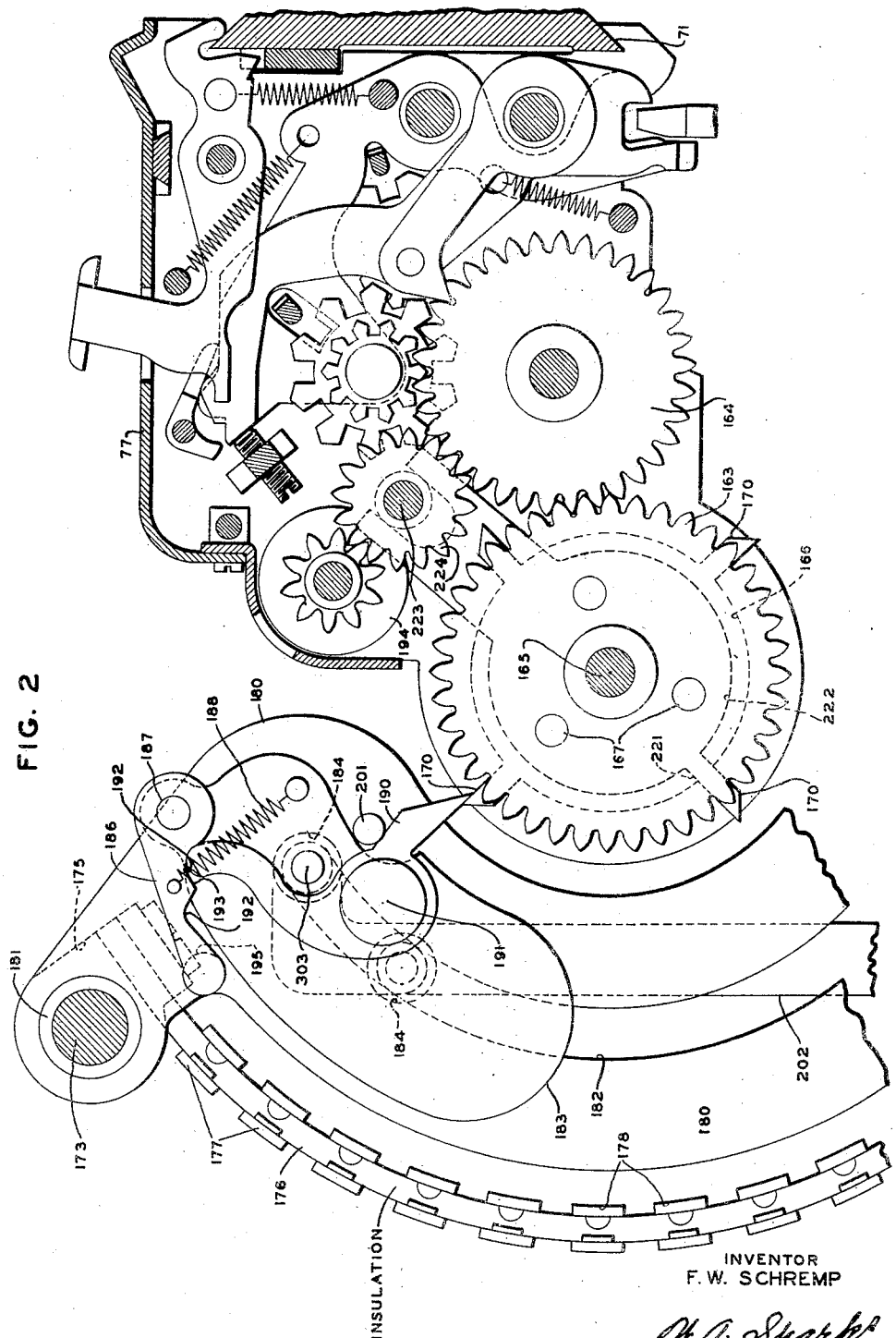
Fig. 2 is an enlarged section through the cross-totalizer and showing a portion of the contact devices, said devices being in the positions they occupy at the top of the stroke thereof.

The improved numeral sensing apparatus for reading out the totals from the cross totalizer 77 includes certain stationary framing in front of said totalizer. This framework includes right and left-hand frame plates 171 and 172 (Figs. 1 and 5) rigidly connected together by upper and lower frame rods 173 and 174, said frame plates being suitably secured flat against the frame plates 55 and 56, respectively, of the regular Remington machine. Three auxiliary frames are strung on and supported by the rods 173 and 174. The left-hand frame comprises upper and lower yokes 175, the formed-up ears of which are perforated and strung on the two rods. To the yoke bars of said yokes are secured the upper and lower ends of an arc 176 of insulating material, curved concentrically with the shaft 165 (Figs. 1, 2, and 3). Said arc supports eleven pairs of electrical contact blades of the usual kind, the outer blade 177 of each pair being secured to the outer surface and the inner blade 178 to the inner surface of the arc. Said blades project rightward (Fig. 5) from the arc 176, their free ends being in the vicinity of the plane of the cross master wheel 62. These contacts are spaced angularly about the axis of shaft 165 to correspond with the tooth-spacing of the gear wheels 163. The upper ten contact pairs signify the digits 0–9, the bottom pair being for another purpose to be explained hereinafter.

The mechanism for selectively closing the contacts 177, 178, in accordance with the amounts registered on the totalizer wheels, is mounted in part on the second of the auxiliary frames supported by the rods 173 and 174. This frame consists essentially of a plate 180 riveted or staked to two hubs 181 (Fig. 5) strung respectively on the said rods and preferably elongated leftward to act as spacers between the plate 180 and the yokes 175 of the first frame. These hubs may be secured in place on the rods by set screws. As best shown in Figs. 2 and 3, the plate 180 has its main outline generally concentric with the shaft 165, and it also has in it a long slot 182 which is also concentric with said shaft. Said slot guides the circular motion of a sensing structure comprising a plate 183 having secured thereto two headed screws 184 which pass through the slot 182 and have a running fit in the slot to guide the motion of the plate 183 in a circular path. A contact lever 186 (Fig. 2) is pivoted to the plate 183 at 187 and is drawn inward by a spring 188. A trigger 190, pivoted at 191 to the plate 183, has an arm capable of engaging in one or the other of two rounded notches 192 in the edge of the lever 186, said notches having between them a hump 193. Said notches, in the spring-urged lever 186, serve to retain the trigger 190 yieldingly in the two positions to which it can be moved. The point of the trigger 190 is adapted, when the sensing structure is drawn downward, to strike and to be deflected by a tooth 170 of the disk 166 which at the time is geared to the master wheel 62.

When a register dial 194 indicates 0, the teeth 170 of the corresponding disc 166 stand in the positions shown in Figs. 2 and 3, and in adding operations they move counter-clockwise. Beginning with the position shown in Fig. 2, when the member 183 is drawn down the trigger 190, dragging over the tooth 170, will be rotated counter-clockwise about its pivot 191 until its inner finger escapes from said tooth. In this movement, the rounded outer end of the trigger will have first a short dwell movement in the right-hand notch 192 in the member 186, and then, riding up on the hump 193, will rotate said member clockwise. When the end of the trigger passes the dead-center of the hump, the spring 188 will cause the trigger to be snapped into the left-hand notch 192, moving the inner finger of the trigger outside of the orbit of the teeth 170 and the lever 186 returning to its normal position relative to the member 183. The lever 186 has a small post 195 of insulating material projecting leftward from its end (Fig. 5), and the ends of the contact springs 178 are in the path of this post. When the member 183 moves downward, this post moves first concentrically of shaft 165, then outwardly, and then inwardly, the movement being a composite of the bodily movement of the lever 186 with the member 183, and a pivotal swinging of the former. The parts are so proportioned that the post moves behind the 0 spring 178, deflects it to close the contact, and returns before it reaches the next contact spring. When the dial indicates some digit other than 0, the tooth 170 will, of course, occupy the appropriate one of the nine positions between the positions occupied by the left-hand two teeth 170 in Fig. 2, and the corresponding contacts will be closed.

The wheel that is sensed, as just described, is the one whose carrier wheel 164 is at the time in mesh with the master wheel 62 (Fig. 3). In the Remington machine said master wheel, at all times except during an actual computing movement, is positively locked by a pawl 196, pivoted at 197 and having a cam edge and slot controlled by a pin 198 on an arm of the universal rock-shaft 200 of the machine as described in Patent 1,270,471. Said pin normally contacts an edge of said pawl concentric with the shaft 200 as shown in Fig. 3. The disk 166 is thus prevented from being rotated by the trigger 190.

Once the trigger 190 has been deflected by a tooth 170 as described it will remain in its deflected position out of the orbit of said teeth until on its return stroke it is restored by abutting a pin or lug 201 projecting from the fixed guide plate 180, by which pin it is swung back to its active position shown in Fig. 2. This involves an outward and return swinging of the lever 186 and post 195, which, however, occurs just after said post has passed the O contact spring 178.

In order to reciprocate the plate 183, the upper screw 184 has pivoted thereto a vertical link 202 which (Figs. 1 and 9) is pivoted to one arm 203 of a lever whose other arm 204 is connected thereto by a yoke or bail bar 205, said arms pivoted loosely on the rod 153 which at its right-hand end is prolonged for the purpose. The arm 204 is inside the typewriter frame, and it is connected by a link 206 with a lever 207 pivoted the same as the levers 148 and like them impelled downward by a strong spring 150. The lever 207 has a follower roller 208 bearing on a cam 210 loose on the power shaft 141 at the right of the cams 143 and controlled by a clutch whose dog 211 is shown in Fig. 1. This dog is normally held disengaged by a detent 212 pivoted at 213 and controlled by a spring 214 and a solenoid 215, whose core is connected with said detent by a link 216. When the solenoid 215 is energized, the detent 212 is swung counter-clockwise releasing the dog 211. At the end of a partial rotation, conveniently about a half turn, said dog and the cam are arrested by a second pivoted detent 217 controlled by a spring 218 and solenoid 220. When this solenoid is energized, the cam completes its rotation.

The outline of the cam 210 is, as shown in Fig. 1, such that, in normal position the lever 207 and sensing plate 183 are a little short of their uppermost positions, so that the trigger 190 is about to strike the lug 201 but has not yet been restored to its active position. The upward motion is completed by the first part of the first half rotation of the cam, the parts then moving downward, being in their lowest position at about the time when the cam is arrested in mid-rotation; and said parts are forced upward during the second half-rotation. In Figs. 2 and 3 these parts are shown in their top positions, early in the first half rotation of the cam. The parts are left normally short of this position so as to keep the trigger 190 out of the path of rotation of the teeth 170.

The Remington totalizers frequently have one or more denominational positions left blank for punctuation, one such space being shown in Fig. 5 for the decimal point in money values. In order to operate the space key when such a space reaches the master wheel, the totalizer 77 is provided in such space with a special fixed tooth 221 (Fig. 2) projecting the same as the teeth 170 and in the eleventh position. This tooth is part of a plate 222 which is strung on the shaft 165 and which, to prevent its turning on said shaft, has a bifurcated extension straddling the shaft 223 of the idler pinions 224, which pinions communicate the rotation of the carrier wheels 164 to the dials 194. The excursion of the sensing mechanism is such as to include this eleventh position. When a dial indicates 0, there is a tooth 170 in this eleventh position, but the trigger 190 is then tripped by the upper tooth 170 and does not strike this lower one. In the blank space the tooth 221 deflects the trigger, closing the eleventh pair of contacts 177, 178; these are marked SB in the electrical diagram, where it will be seen that they are in the circuit of a solenoid 225. This solenoid (Fig. 1) has its armature connected by a link 226 with one of the lever arms 46 of the space bar 45, to depress the same and cause a carriage step.

The circuits of the magnets 215 and 220 are controlled by the stepping of the carriage, which involves a one-tooth rotation of the escapement wheel 30 (Figs. 4 and 7) at each actuation of the dog rocker 31. The Remington machine is usually equipped with a pawl 227 on a vertical pivot 228 on the top plate of the machine, said pawl urged by a spring 230 to cause its tooth 231 to engage behind a tooth of the escapement wheel after each step thereof to prevent backward rotation of said wheel. The tooth 231 has one inclined and one abrupt face. At each stepping movement of the wheel, this pawl 227 is swung rearward, and it snaps back to its forward position at the completion of the step. This pawl has been prolonged and, through a pusher 232, controls a contact blade 233 which normally makes contact with another blade 234, but is deflected out of contact therewith and into contact with a third blade 235 during the stepping movement (see Fig. 11).

The total key 236 is in the form of a bell-crank pivoted to the outside of the typewriter frame 20 and having its depending arm pivoted to a link 237 having a restoring spring 238. This link has a lug 240 which when the key is depressed closes the main circuit contacts 241 of the total-writing attachment. In order to hold these contacts closed throughout the total writing operation and then to open them, the link 237 operates a lever arm 239 fast on a rock shaft (Figs. 1 and 8) whose inner end carries an arm 242 which bears a lug 243 adapted to be engaged and locked by a horizontal latch lever 244 pivoted at its middle to a bracket on the front post of the typewriter frame. At its front end this lever has an extension 245 lying in such a position that it is deflected leftward by the cross truck 71 in the step thereof following the writing of the last digit of the total, and which step also results in the disconnection of said truck from the vertical totalizer. The deflection of the latch lever releases the total key which immediately returns to normal and breaks the main circuit at 241.

A series of ten solenoids 247 (Fig. 4) are secured to a certain cross-frame bar 248 of the Remington machine, and the armature of each is connected by a link 250 with a depending arm of the trip pawl 145 of one of the numeral keys, so that these pawls may be tripped by said solenoids as well as by the keys.

Figure 11:
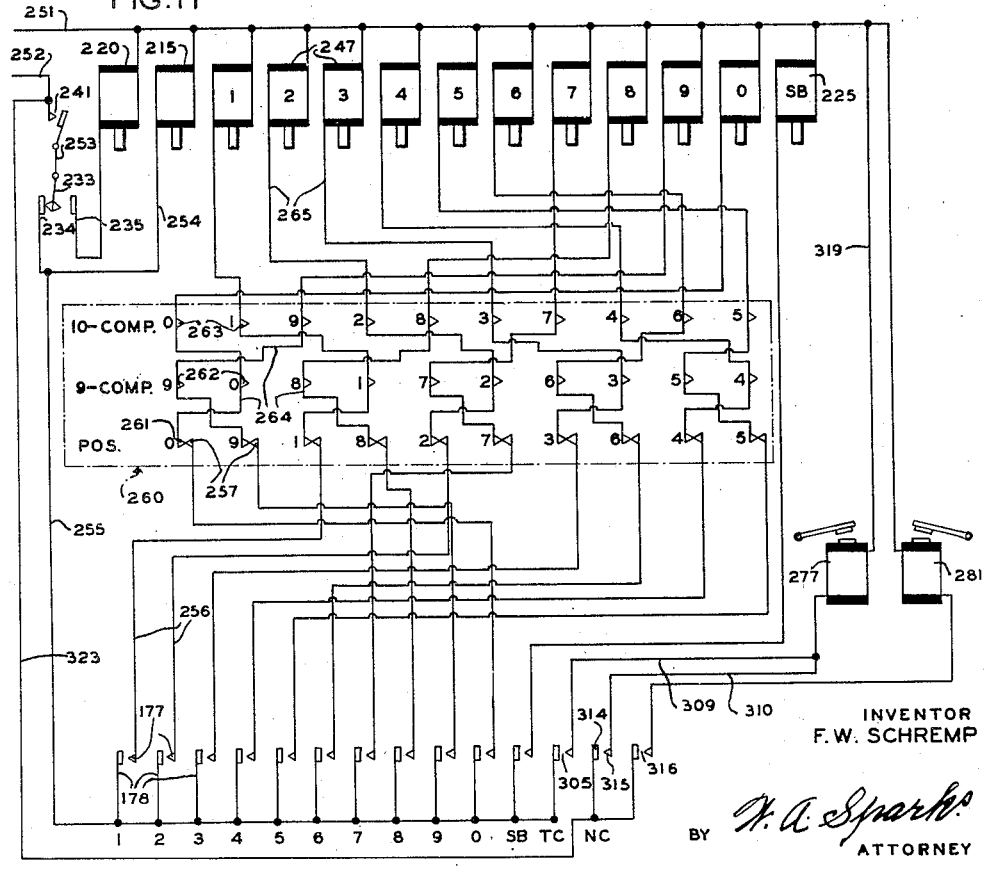
Fig. 11 is the circuit diagram of the total printing mechanism.

The operation of writing a positive total may now be understood by reference to the electrical diagram, Fig. 11. In said diagram, 251, 252 are the leads to a source of direct current, and all of the solenoids 215, 220, 225 and 247 have their returns connected to the lead 251. The lead 252 terminates in one of the main contacts 241, the other of which is connected by a wire 253 with the contact blade 233. The latter is normally in contact with spring 234 which is connected by a wire 254 with the solenoid 215. Blade 234 is also connected to wire 255 which is a common conductor for all of the contacts 178 of the sensing mechanism. The ten numeral contacts 177 are connected by wires 256 to ten brushes 257 of a multiple switch 260 to be more particularly described hereinafter. Said switch contains three rows of contacts or commutator segments 261, 262 and 263, with which the brushes 257 are adapted to contact respectively. Wires 264 connect each contact 261 with a contact 262 and a contact 263 according to a rule which will be explained. Each contact 263 is connected by a wire 265 with the appropriate one of the numeral solenoids 247 which cause the digits of the total to be registered and printed. For writing positive totals brushes 257 occupy their normal positions in engagement with the contacts 261 as shown in Fig. 11 in which a circuit may be traced from each contact 177 through wire 256, brush 257, contact 261, wires 264 and 265 to the solenoid 247 of the same numerical value.

When a positive total is to be copied from the cross totalizer 77, the typewriter carriage is brought by any suitable means, as by a depression of a tabulator key 49 (Fig. 4) into the field of that one of the vertical totalizers 70 which defines the new balance column and to the denominational position occupied by the highest digit of the total in the cross totalizer, which latter is also positioned at the same time. The cam 120 of this vertical totalizer will have been so set as to automatically set the cross master wheel for subtraction if it is desired that the writing of the total shall clear the totalizer; otherwise, the cam is set at disconnect. The operator then depresses the total key, and the mechanism thereupon writes the total automatically, the toal key being locked down by the latch 244. The closing of the main contact 241, establishes a circuit through wire 253, contacts 233, 234, wire 254, and solenoid 215 to source. Solenoid 215 releases the dog 211 of the clutch of cam 210, which makes a half rotation, being arrested by latch 217. Such half rotation first completes the up-stroke of sensing plate 183, swinging the trigger 190 into the position of Fig. 2, and then draws said plate and said trigger to the bottom of their stroke. The trigger will encounter a lug 170 at some point in the course of this excursion depending on the digit indicated, and will close the appropriate contacts 177, 178. This establishes the described circuit through the appropriate solenoid 247, setting the appropriate cam 143 into rotation, which first actuates the master wheels 61 and 62 accordingly and then prints the digit. In the cross totalizer this digit is subtracted from itself, leaving the dial at 0. During the resulting step of the carriage, the pawl 227 momentarily deflects the blade 233, breaking the circuit of the solenoid 215 and closing that of the solenoid 220. The latter trips the detent 217 (Fig. 1) and allows the cam 210 to complete its rotation. As soon as the carriage completes its step to the next denomination, the pawl 227 breaks the circuit of solenoid 220 and reenergizes solenoid 215, whereupon the above described cycle is repeated. The lug 221 causes the same cycle at the punctuation point, except that nothing is registered or printed but only the space bar is operated. After the writing and subtracting of the lowest digit, the carriage again steps, breaking the circuit of solenoid 215 and closing that of 220 as before; but at the same time the cross-truck trips the latch 244 and breaks the main circuit so that when the dog 211 for the cam 210 reaches the detent 212, solenoid 215 is not energized and the mechanism stops in normal position. In the above operation the digits of the total are written one by one and are subtracted in the cross totalizer, leaving the latter clear.

From the above description it will be perceived that the cam 210 begins its rotation sooner than the numeral cam 143 and, if allowed to do so, would complete it before the numeral was written and would then start another rotation. It is for this reason, and to produce proper timing, that the cam 210 is arrested in mid-rotation, and is not started again until the carriage has already made a considerable part of its step to the next denomination. At the same time the detent 212 is restored to its arresting position where it remains until the carriage has completed its step, when it is again released. The process of sensing the second digit thus begins immediately after the carriage assumes the proper position.

The means for controlling the mechanism so as to write a negative total or "credit balance" will now be described. The totalizer 77 has at least one more register wheel than would be required to register the largest total contemplated, so that the highest wheel will show 0 when the total is positive and 9 when it is negative. The totalizer has no fugitive one mechanism, and a negative total will, therefore, appear by its true arithmetical complement. In a seven-wheel totalizer, negative 206 would appear as 99997 94

Negative 206 00, would appear as 99794 00

Negative 906 00 would appear as 99094 00

Such totals should be written according to the following rule familiar to all operators of non-printing adding machines: All 0's at the right, if any, are written as 0's. Of the remaining digits all are written by their 9-complements except the last which is written by its 10-complement; or, the 9's at the left of the total may be and preferably are ignored as representing non-significant zeroes. The mechanism and electric circuit of the present machine are constructed so as to follow this rule.

Figure 10:
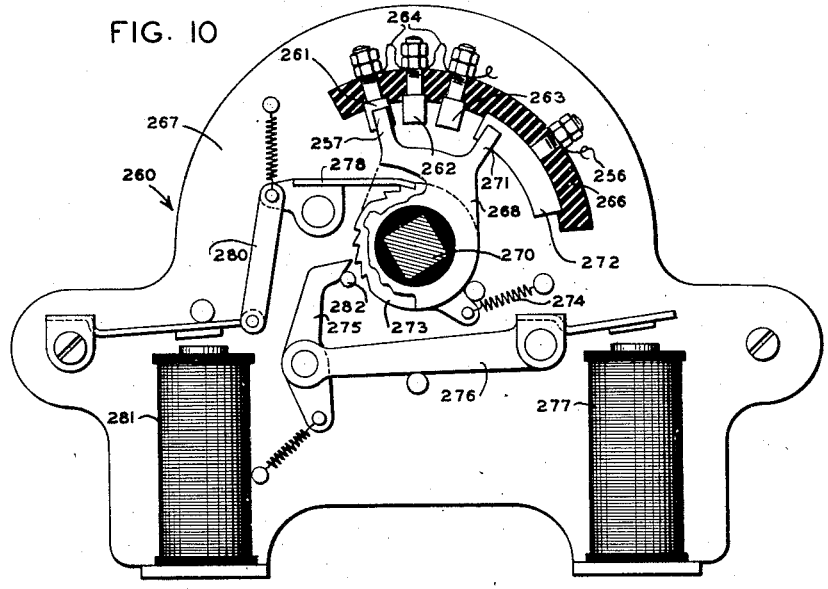
Fig. 10 is a schematic section through a multiple circuit changing device.

The shifting of the electrical connections between the several contacts 177 and solenoids 247 may be effected in various ways. As shown in the present instance a multipole switch 260 (Figs. 10 and 11) has three tiers of stationary contacts or segments 261, 262, and 263, ten contacts in each tier, and the brushes 257 can be moved from one tier to the next. The switch may be attached to the machine at any convenient place, as it is operatively connected therewith only by wires. In the form represented in Fig. 10, the three tiers of contacts consist of three rows of plugs secured in a segmental cylindrical insulating arc 266 supported by end plates 267. The brushes 257 consist of fingers projecting from insulated discs 268 fast on a shaft 270 journaled in said plates. Said discs have fingers 271 each rubbing over a segment 272 mounted in the arc 266, said segments connected respectively to the appropriate wires 256 which lead to the contacts 177. On one end of the shaft 270 is a ratchet-toothed disc 273 having an arm acted on by a spring 274 which tends to turn the shaft counter-clockwise to its normal position against a stop as shown in Fig. 10. The ratchet and shaft are turned step-wise by a pawl 275 on the armature lever 276 of a magnet 277 whose circuit will presently be described, and are retained in either of their two advanced positions by a pawl 278 which is connected by a link 280 with the armature of a magnet 281 an energization of which trips the retaining pawl and allows the spring 274 to restore the shaft. The pawl 275 is normally held out of engagement with the ratchet by a guide pin 282.

The circuit of the magnet 277 is closed by the depression of the credit balance key preparatory to writing a negative total, shifting the brushes 257 from the contacts 261 to the contacts 262. It is energized again just before writing the last digit of the total or the last digit preceding the right-hand 0's if such there are, shifting said brushes to the contacts 263. The magnet 281 is energized at the end of the total writing operation to restore the switch to normal.

As shown in Fig. 11, the wires 264 of the multipole switch are so connected that when the brushes 257 are on contacts 261, each contact 177 is connected to the solenoid 247 of like numerical value, as hereinbefore explained; and they are so arranged that, when said brushes are on the contacts 262, each contact 177 is connected to the solenoid 247 of a numerical value equal to the 9-complement of that of the connected contact 177. The 0 contact is connected to the 9 solenoid, the 1 contact to the 8 solenoid, and so on. Said wires 264 are also so arranged that when the brushes 257 are on the contacts 263, the zero contact 177 is connected to the zero solenoid 247, and each of the other such contacts is connected to the solenoid whose numerical value is the 10-complement of that of the contact. The 1 contact is connected to the 9 solenoid, the 2 contact to the 8 solenoid, and so on. It will be perceived that with this multipole switch shifted at the proper times, the machine will follow the rule given above for writing a negative total from its true complement as registered in the totalizer.

In order to detect the approach to the master wheel of the denomination containing the last digit other than 0, the following mechanism is provided. (Figs. 1, 3 and 5.) At the right of the plate 180, there is mounted on the frame rods 173 and 174 a frame structure consisting of sleeves 283 strung on said rods and two arc shaped plates 284 and 285 staked to said sleeves. Movably mounted on said plates is a sensing member consisting of an arc-shaped portion 286 having flat wings 287 at its ends, said wings embracing the plates 284 and 285 and supported thereby by screws 288 passing through slots in said wings and threaded into said plates. Said slots are so disposed and of such length as to allow to the sensing member a limited oscillation about the axis of the shaft 165. The arc 286 has its left-hand edge two letter spaces to the right of the plane of the master wheel 62 and it is of such length that when the highest wheel of the totalizer engages the master wheel, the lowest wheel 163 stands behind said arc. The inner surface of said arc has nine longitudinal ribs 290 so disposed that in the travel of the totalizer the sensing teeth 170 may move through the intervening slots. The sensing member 286, 287 is normally held in its upper position shown in Figs. 1 and 3, and when it is in that position and a wheel 163 stands at zero, its teeth 170 stand as shown in Fig. 3, one of said teeth being just above the uppermost rib 290 and another a tooth-space distance below the lowermost rib, so that, if the sensing member was released it could drop down one tooth space. If, however, any wheel within the range of the sensing member stands in any other than its zero position, one of its teeth 170 stands just below a rib 290 and would prevent the member from falling. The sensing member is released once for each digit-writing cycle to detect the presence or abscence within its field of a wheel out of zero position. The member may be urged downward by springs 291.

The sensing member 286, 287 is normally held in its upper position by a lever 292 pivoted on the frame rod 174 against the left-hand face of the plate 284 and urged counter-clockwise in Fig. 3 by a spring 293, the end of the lever pressing upward on the left-hand wing 287. It is released from the action of said lever once at each wheel-sensing operation when writing negative balances only, by the following means. When the operator of the machine notes that the total is negative, he depresses the credit balance key 133 before depressing the total key. The lower arm of this key operates a long horizontal link 294, whose right-hand end is pivoted to a horizontal bell-crank 295 (Fig. 9) which by a link 296, is connected to an off-set arm 297 of a lever 298 pivoted bail-fashion on the frame rod 174. The link 296 has a pin and slot connection 300 with the lever arm 297, so that after the lever 298 has been swung clockwise in Fig. 3 by the depression of the credit balance key, it can be swung still further by other means. The right-hand arm of the lever 298 extends upward and has a pin 302 which, when the lever is rocked as described, comes in contact with or close to the edge of the arm 292. The upper end of the lever 298 normally stands in front of the slot 182 in the frame plate 180, but when the lever is rocked by the credit balance key it is swung so as to stand across said slot and in the path of a prolongation 303 (Fig. 5) of the upper guide screw 184. At each downward movement of the sensing member 183, this member 303 depresses the lever 298 and causes its pin 302 to rock the arm 292 away from the wing 287, leaving the sensing member 286, 287 free to drop if no wheel behind it stands at a number other than zero. It will drop for the first time when the last such wheel has just stepped to the left of it; that is to say, when the mechanism is sensing the last wheel whose numerical indication should be written by its nine-complement. The spring 293 restores the sensing member to its upper position as soon as the pin 303 moves upward. When the sensing member 286 drops, an arm 304 thereon closes the contacts 305 in the circuit of the magnet 277 and causes the brushes 257 of the multipole switch to engage the contacts 263. This occurs at the last part of the downstroke of the member 303 and after the wheel then at the master wheel has been sensed. At the next step of the carriage, the last wheel showing a number other than zero will engage the master wheel. The contacts 305 will be closed at each succeeding sensing operation if any, but idly as the ratchet 273 has no more teeth.

The magnet 277 receives its first energization by the depression of the credit balance key 133. Any suitable switch may be arranged to be closed momentarily by the depression of this key and so as not to be closed by the return motion of the key to normal position. In the form shown in Fig. 5, an arm 306 fast on the shaft 128 has a pin 307 adapted to act on a flange 308 formed off from a lever 310 pivoted at 311 and acting on the blade which supports a contact 314. The arrangement is such that, when the shaft 128 is rocked counter-clockwise by depression of the credit balance key, the pin 307 rubbing over the flange 308 rocks the lever 310 and closes contact 314 against companion contact 315, the pin thereafter swinging clear of the flange and permitting the lever and contacts to return immediately to normal position. On the return stroke of the key the pin 307 strikes behind the flange 308, and swings the lever 310 idly without closing the contact, and escapes from the flange, and the lever 310 swings back to normal position. As the credit balance key is depressed before the total key, the contact 314 is connected to lead 252 directly by a wire 323 (Fig. 11), and not through the main switch 241. One of the contacts 316 is also connected to this wire. The contacts 305 and 315 are both connected to magnet 277 by wires 309 and 310. The return wire 319 of magnet 277 goes direct to lead 251.

The energization of the magnet 281 may be caused by closing its circuit momentarily in any suitable way after the writing of the total has been completed. In the present instance, this is done at a pair of contacts 316 (Fig. 1) operated by the return motion of the link 237, which as above described occurs immediately after the writing of the last digit of the total. In the form shown, said link has adjustably fixed thereto a piece 317 having an inclined flange 318 formed off therefrom and adapted to engage a pin 320 projecting from a lever 321 pivoted at 322 and resting on a piece of insulating material attached to one of the spring blades carrying the contacts 316. The arrangement is such that, during upward and rearward motion of the link 237 when the total key is depressed, the flange 318 passes under and beyond the pin 320, raising the lever 321 idly. On the return motion of the link, the flange passes over the pin and depresses it, closing the contact. The pin then escapes from the flange and the lever returns to normal position.

The mode of writing a negative total is as follows: In order to prevent the writing of non-significant zeros, the operator preferably, as for example by depressing the appropriate one of the tabulator keys 49, brings the carriage to the denomination showing the first significant digit. Observing that the highest wheel shows nine, he then depresses the credit balance key 133 which reverses the gearing (Fig. 6) swings the lever 298 (Fig. 3) to its active position and momentarily closes the contacts 314, 315 (Fig. 5), thus energizing the magnet 277 (Fig. 10) and swinging the brushes 257 into contact with the segments 262, thus connecting the machine up to write nine-complements. He then depresses the total key 236, which becomes locked down by its latch 244, and closes the main contacts 241. This closes the circuit 233, 234, and 254 (Fig. 11) to the solenoid 215 (Fig. 1) releasing the clutch of the cam 210, which makes a half rotation. This pulls down the contact unit 183, the same as in the writing of a positive total, but the contacts 177 are now wired each to its complementary magnet 247 and the digits written will be the nine-complements of the digits indicated on the totalizer. Meanwhile at each operation of the sensing unit 183, etc., the sensing device 286 (Fig. 3) will be released, but will not drop until all of the wheels 163 and teeth 170 indicating some digit other than zero have passed out of its range. On that operation which prints the nine-complement of the next to the last significant digit, the last wheel containing any significant digit will have escaped from the sensing device 286, which will this time drop down closing contacts 305 and again energizing magnet 277, bringing the brushes 257 into engagement with the contacts 263. The resulting step of the carriage brings into operation the last wheel showing a digit other than zero. When on the next sweep of the digit sensing device, this last digit is sensed, its contact 177 will energize the magnet 247 whose value is the ten-complement of said last digit. The zeros following said digit, if any, will be printed as zeros. After the printing of the last zero or other digit, the last step of the cross truck will trip the latch 244, releasing the total key, which will return to normal position, breaking the main circuit. At the same time, the contacts 316 will be closed, energizing the magnet 281, which releases the shaft of the multipole switch 267 and said shaft will be returned by its spring 274 to its normal position. At each step of the carriage following an operation of a digit sensing device, the escapement wheel of the carriage will have momentarily opened the circuit through contact 234 and closed that through contact 235 and solenoid 220, thus releasing the cam 210 for the second half of its rotation. On the last operation, the main circuit will have been broken at 241 before the dog 211 reaches its detent 212 and this cam will, therefore, stop, leaving the whole mechanism in its normal condition with the totalizer cleared except for the credit balance key. This the operator releases by tapping the release key 134.

It will be observed that normally the sensing trigger 190 is entirely out of the range of movement of the teeth 170, so that the totalizer is free to travel and its wheels to rotate in computing operations without any contact with the digit-sensing mechanism. Also, normally the detecting sensing device 286, 287 is held in its upper position so that the teeth 170 may pass freely through the grooves in its inner surface during the travel of the cross totalizer. These sensing devices are brought into engagement with the wheels only momentarily at times when the carriage is at rest and when sensing is required, and by the energy of the power mechanism.

When the carriage is arrested by the tabulator stops after a free run, the totalizers at the front of the machine momentarily move by overthrow past their proper positions. In the present construction the sensing devices are inactive at that moment and are brought into engagement only after the vibration has ceased.

It will be perceived that if the circuit of a digital solenoid 247 was kept closed for a certain time, the cam would not be arrested at the end of one rotation but would repeat the operation of subtracting and recording the digit. By the present construction the contacts 177, 178 are closed only momentarily, so that no auxiliary mechanism or electrical devices are required to prevent repeat operations.

While I have described what I consider to be a highly desirable embodiment of my invention, it is obvious that many changes in form could be made without departing from the invention, and I, therefore, do not limit myself to the exact form herein shown and described, nor to anything less than the whole of my invention as hereinbefore set forth, and as hereinafter claimed.

What I claim as new, and desire to secure by Letters Patent is:

1. The combination of a totalizer having a wheel equipped with a tooth to be sensed, a cooperating sensing device including a trigger, means for drawing said cooperating sensing device in an arc about the axis and in the plane of said wheel whereby said trigger is tripped by engagement with said tooth at a variable point in its arcuate travel depending on the digit indicated by said wheel at the time, and a plurality of control devices to be selectively operated by said trigger as it is tripped by said tooth.

2. The combination of a totalizer having a wheel equipped with a tooth to be sensed, a cooperating sensing device including a trigger, means for drawing said cooperating sensing device in an arc about the axis and in the plane of said wheel whereby said trigger is tripped by engagement with said tooth at a variable point in its arcuate travel depending on the digit indicated by said wheel at the time, a series of digital electro-magnets, and means whereby said trigger when tripped closes the circuit of the selected one of said magnets.

3. The combination of a totalizer having wheels each equipped with a device to be sensed, a cooperating sensing device normally out of the range of movement of said wheels, means for imparting a step-by-step relative movement to said totalizer and said cooperating sensing device, power operated means for moving said cooperating sensing device into sensing engagement with one of said wheels at a time, and means whereby the relative stepping movement automatically initiates an operation of said power operated means, whereby the wheels are automatically sensed one after another in a continuous operation.

4. In a combined typewriting and computing machine the combination of a step-by-step moving carriage, power operated types, a platen, computing mechanism including a totalizer, means for sensing the wheels of said totalizer one at a time at the several steps of said carriage, power operated means for moving said sensing means into sensing engagement with a wheel of said totalizer, means whereby the stepping movement of said carriage initiates an operation of said moving means, and means controlled by said sensing device for selectively causing operations of said power-operated types.

5. The combination with an adding and subtracting totalizer having wheels adapted to be sensed, of means for sensing the digital positions of said wheels one at a time, said means and said totalizer having a relative travel from one denomination to another, recording means, means whereby said recording means is controlled by said sensing means, said controlling means having three settings, one to record the digit indicated by the sensed wheel, one to print the nine-complement of said digit, and one to print the ten-complement. of said digit other than zero and a zero as zero, a second sensing device cooperating with wheels of lower order than the wheel sensed by said digit-sensing means and detecting the approach of the last wheel indicating a digit other than zero, said second device adapted to move when said last wheel has passed beyond it, and means controlled by the second sensing means when so moved for changing said controlling means from its second said setting to its last said setting.

6. The combination of a totalizer having wheels provided with projections ten digit spaces apart, a movable sensing device with respect to which said totalizer has a traveling movement, said sensing device being of a length to cover a series of such totalizer wheels and of an effective width of nine digit spaces of said wheels and arranged to be supported against movement by any of said projections within its range and standing in a digital position other than zero and to move when in the relative travel of the totalizer it is no longer so supported, and mechanism controlled by said sensing device.

7. The combination with a totalizer, of reading-out means including an electric circuit comprising contacts one for each digit, electro-magnets one for each digit, and switching means including means for connecting each digital contact to the magnet of like digital value, means for connecting each digital contact with the magnet whose value is the nine-complement of that of the contact, and means for connecting the zero contact with the zero magnet and each other contact with the magnet whose value is the ten-complement of that of the contact, the last recited means acting automatically for reading the lowest wheels beginning with the first that indicates a digit other than zero; and means for closing said contacts selectively under control of a wheel of said totalizer.

8. The combination of a totalizer, an electric circuit comprising contacts one for each digit, electro-magnets one for each digit, and switching means including means for connecting each digital contact with the magnet of like digital value, means for connecting each digital contact with the magnet whose value is the nine-complement of that of the contact, and means for connecting the zero contact with the zero magnet and each other contact with the magnet whose value is the tens-complement of that of the contact, means for imparting a relative step-by-step feed to said totalizer and said contacts and at each step closing the contact appropriate to the digit indicated by a wheel of the totalizer, means associated and cooperating with the totalizer wheels for sensing the approach of the lowest totalizer wheel indicating a digit other than zero, and means controlled by said sensing means for effecting the last recited switching of the electric circuit.

9. The combination with a totalizer, of means for sensing one at a time the digits of a total registered on said totalizer, recording means, connections whereby said sensing means controls said recording means, a normally inactive device for testing the lower wheels of the totalizer to detect the presence of a wheel registering a digit other than zero, means controlled by said testing device for changing the said connections, and means acting once at each digit-recording operation to bring said testing device into action.

10. The combination with a totalizer, of means for sensing one at a time the digits registered on said totalizer, recording means, connections whereby said sensing means controls said recording means, means for shifting said connections from condition to cause said recording means to record the digit registered on a wheel of said totalizer to condition to cause the recording of the nine-complement of such digit, a normally inactive device for testing the lower wheels of the totalizer to detect the presence of one registering a digit other than zero, means controlled by said testing device for making a second shift of said connections, and means controlled by the first recited shifting means for making said testing device and the second recited shifting means effective.

11. The combination of a relatively moving totalizer having wheels, a sensing device having a configuration substantially similar to that of the wheels, means on the wheels to maintain the sensing device in one position as long as the wheel registering the last digit other than zero of a total is passing the sensing device, means for moving the sensing device to another position when said wheel has passed beyond the sensing device, and circuit means affected by the movement of said sensing device.

12. The combination of a totalizer having a movable member equipped with a device to be sensed, a cooperative sensing member having an element to engage said device and be moved when engaged, means for drawing the sensing member across in front of the movable member, and a plurality of control devices selectively operated by said element as it engages the device to be sensed.

13. The combination of a totalizer having a movable wheel equipped with a device to be sensed, a cooperative sensing member having an element to engage said device and be moved when engaged, means for drawing the sensing member across the face of the wheel and in the plane thereof, and a plurality of control devices selectively operated by said element as it engages the device to be sensed.

14. The combination of a totalizer having a movable member equipped with a device to be sensed, a cooperative sensing member having an element to engage said device and to be moved when engaged, means for drawing the sensing member across in front of the movable member, a plurality of control devices selectively operated by said element as it engages the device to be sensed, a step-by-step carriage, and means operated by the carriage to restrain the return of the sensing member to normal position until after the carriage has been stopped.

15. The combination of a totalizer having a wheel equipped with an element to be sensed, said element adapted to be moved to a plurality of positions in a single plane, a cooperative sensing device, means for drawing said sensing device along the face of the wheel in the plane of said element, and a plurality of control devices to be selectively operated by said sensing device as it travels in front of the wheel and engages the element to be sensed.

16. The combination of a totalizer having wheels and an element to be sensed on each wheel and adapted to be moved in a plane to a plurality of positions as the wheels are selectively rotated, a cooperating sensing device, a power operated cam, and a follower operated by said cam and connected to said sensing device to draw the same along the face of the positioned wheel in the plane of the element thereon to be sensed, and a plurality of control devices to be selectively operated by said sensing device as it is drawn along the face of the wheel.

17. In a machine for recording characters one at a time, the combination of a step-by-step traveling carriage, a toothed escapement wheel which moves each time the carriage is spaced, a pawl having a beveled tooth normally lying between the teeth of the wheel, and resiliently urged to this position, a circuit controlling device connected to the pawl and operated thereby as the tooth of the pawl is moved out by the teeth of the escapement wheel each time the carriage is spaced.

18. In a machine of the class described, having means for adding and subtracting numbers including a step-by-step movable totalizer which registers a negative total by its true complement, printing instrumentalities, and electro-mechanical means for automatically, successively and selectively bringing about an actuation of said printing instrumentalities for printing a total in accordance with and as determined by the set-up in said totalizer, the combination of means settable to adjust the electro-mechanical means to cause the printing of the nines complement of the digits of a complementary total, movable means disposed in cooperative relation to the totalizer wheels for sensing the denominational position of the last digit other than zero of a complementary total, and means controlled by said sensing means when moved to further adjust the electro-mechanical means to cause the printing of the tens-complement of said last digit and to print any succeeding zeros as zeros.

FREDERICK W. SCHREMP.